(12) United States Patent
Lucas

(10) Patent No.: US 9,038,830 B2
(45) Date of Patent: May 26, 2015

(54) FILTER DEVICE

(71) Applicant: 3M Innovative Properties Company, St. Paul, MN (US)

(72) Inventor: Jeffrey A. Lucas, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/734,557

(22) Filed: Jan. 4, 2013

(65) Prior Publication Data

US 2013/0199985 A1 Aug. 8, 2013

Related U.S. Application Data

(62) Division of application No. 12/809,194, filed as application No. PCT/US2008/086923 on Dec. 16, 2008, now abandoned.

(60) Provisional application No. 61/016,149, filed on Dec. 21, 2007.

(51) Int. Cl.
| | | |
|---|---|---|
| *B01D 29/01* | (2006.01) | |
| *B01D 29/03* | (2006.01) | |
| *B01D 29/21* | (2006.01) | |
| *B01D 25/26* | (2006.01) | |
| *B01D 29/52* | (2006.01) | |

(52) U.S. Cl.
CPC .............. *B01D 29/016* (2013.01); *B01D 29/52* (2013.01); *B01D 25/26* (2013.01); *B01D 29/031* (2013.01); *B01D 29/213* (2013.01); *B01D 2201/02* (2013.01)

(58) Field of Classification Search
None
See application file for complete search history.

(56) References Cited

U.S. PATENT DOCUMENTS

| | | | |
|---|---|---|---|
| 624,014 | A | 5/1899 | Hagerty |
| 1,647,799 | A | 11/1927 | Hammer |
| 1,809,716 | A | 6/1931 | McDonough |
| 1,846,584 | A | 2/1932 | Clark |
| 2,323,896 | A | 7/1943 | Cahill |
| 2,387,368 | A | 10/1945 | Vokes |
| 2,395,449 | A | 2/1946 | Briggs |
| 2,420,414 | A | 5/1947 | Briggs |
| 2,448,157 | A | 8/1948 | Schneider |
| 2,586,078 | A | 2/1952 | O'Malley |
| 2,689,652 | A | 9/1954 | Gretzinger |

(Continued)

FOREIGN PATENT DOCUMENTS

| | | |
|---|---|---|
| DE | 1118758 | 12/1961 |
| DE | 3905854 | 9/1990 |

(Continued)

OTHER PUBLICATIONS

PCT Search Report for PCT/US2008/086923, mailed Jun. 18, 2009.

(Continued)

*Primary Examiner* — Benjamin Kurtz
(74) *Attorney, Agent, or Firm* — Scott A. Baum

(57) ABSTRACT

A filter device is disclosed. The device includes at least one substantially flat filter media that may be encapsulated between non-permeable films. Some embodiments comprise ports for introducing a fluid to be filtered and for evacuating the filtered fluid. Various substrates may be employed therein in cooperation with the at least one filter media to enhance device performance. Also disclosed are various apparatuses configured to contain at least one filter device.

12 Claims, 16 Drawing Sheets

(56) References Cited

U.S. PATENT DOCUMENTS

| | | | |
|---|---|---|---|
| 2,758,760 A | 8/1956 | Bock et al. |
| 2,792,118 A | 5/1957 | Kraissl, Jr. |
| 2,801,009 A | 7/1957 | Bowers |
| 2,840,283 A | 6/1958 | Roussos |
| 2,979,240 A | 4/1961 | Liebeskind |
| 3,106,528 A | 10/1963 | Burks |
| 3,306,794 A | 2/1967 | Humbert, Jr. |
| 3,349,159 A | 10/1967 | Luboshez |
| 3,390,218 A | 6/1968 | Painter et al. |
| 3,474,599 A | 10/1969 | Schwab |
| 3,542,636 A | 11/1970 | Wandel |
| 3,701,433 A | 10/1972 | Krakauer et al. |
| 3,733,267 A | 5/1973 | Haase |
| 3,988,244 A | 10/1976 | Brooks |
| 4,035,304 A | 7/1977 | Watanabe |
| 4,081,379 A | 3/1978 | Smith |
| 4,086,116 A | 4/1978 | Yazaki et al. |
| 4,377,431 A | 3/1983 | Chodosh |
| 4,422,939 A | 12/1983 | Sharp et al. |
| 4,465,213 A | 8/1984 | Lehmann et al. |
| 4,552,661 A | 11/1985 | Morgan |
| 4,680,118 A | 7/1987 | Taga |
| 4,701,267 A * | 10/1987 | Watanabe et al. ............ 604/6.09 |
| 4,828,698 A | 5/1989 | Jewell et al. |
| 4,863,602 A | 9/1989 | Johnson |
| 4,877,526 A | 10/1989 | Johnson et al. |
| 5,075,004 A | 12/1991 | Gershenson et al. |
| 5,174,896 A | 12/1992 | Harms, II |
| 5,211,091 A | 5/1993 | Cole |
| 5,252,207 A | 10/1993 | Miller et al. |
| 5,275,743 A | 1/1994 | Miller et al. |
| 5,342,511 A | 8/1994 | Brown et al. |
| 5,472,606 A | 12/1995 | Steere et al. |
| RE35,241 E | 5/1996 | Capy et al. |
| 5,543,047 A | 8/1996 | Stoyell et al. |
| 5,702,037 A | 12/1997 | Merkel |
| 5,709,771 A | 1/1998 | Fritzman |
| 5,814,219 A | 9/1998 | Friedmann et al. |
| 5,840,188 A | 11/1998 | Kirsgalvis |
| 5,882,288 A | 3/1999 | Paul et al. |
| 6,030,531 A | 2/2000 | Gershenson |
| 6,048,298 A | 4/2000 | Paul et al. |
| 6,113,784 A | 9/2000 | Stoyell et al. |
| 6,238,560 B1 | 5/2001 | Gershenson |
| 6,315,130 B1 | 11/2001 | Olsen |
| 6,409,919 B1 | 6/2002 | Tara |
| 6,511,598 B2 | 1/2003 | Gershenson |
| 6,585,892 B2 | 7/2003 | Gershenson |
| 6,585,893 B2 | 7/2003 | Gershenson |
| 6,626,299 B1 | 9/2003 | Brown et al. |
| 6,706,198 B2 | 3/2004 | Gershenson |
| 6,712,967 B2 | 3/2004 | Gershenson |
| 6,780,217 B1 | 8/2004 | Palmer |
| 6,871,480 B1 | 3/2005 | Goodrich |
| 6,872,309 B2 | 3/2005 | Pearson et al. |
| 7,922,006 B2 | 4/2011 | Fall et al. |
| 2004/0075221 A1 | 4/2004 | Gershenson et al. |
| 2005/0061723 A1 | 3/2005 | Matsushita |
| 2006/0108277 A1 | 5/2006 | Fall et al. |
| 2007/0007218 A1 | 1/2007 | Hundley et al. |
| 2007/0084786 A1 | 4/2007 | Smithies |
| 2007/0102101 A1 | 5/2007 | Spearin et al. |
| 2011/0152054 A1 | 6/2011 | Fall et al. |

FOREIGN PATENT DOCUMENTS

| | | |
|---|---|---|
| EP | 0516846 | 12/1992 |
| EP | 0667800 | 11/1995 |
| GB | 823648 | 11/1959 |
| GB | 1400147 | 7/1975 |
| GB | 1517731 | 7/1978 |
| GB | 2176416 | 12/1986 |
| JP | 60125220 | 7/1985 |
| SU | 1761201 | 9/1992 |
| WO | WO 94/11082 | 5/1994 |
| WO | WO 00/40319 | 7/2000 |
| WO | WO 01/21279 | 3/2001 |
| WO | WO 2006/055710 | 5/2006 |
| WO | WO 2009/085726 | 7/2009 |

OTHER PUBLICATIONS

Int'l Search Report for PCT/US2006/043776, mailed Apr. 6, 2007.
PCT Search Report for PCT/US2005/041682, mailed Jun. 14, 2006.
EP Appl No. 08867451.0 Extended Search Report, Apr. 5, 2011.
EP Appl. No. 06837315.8, Extended Search Report, Dec. 10, 2009.

* cited by examiner

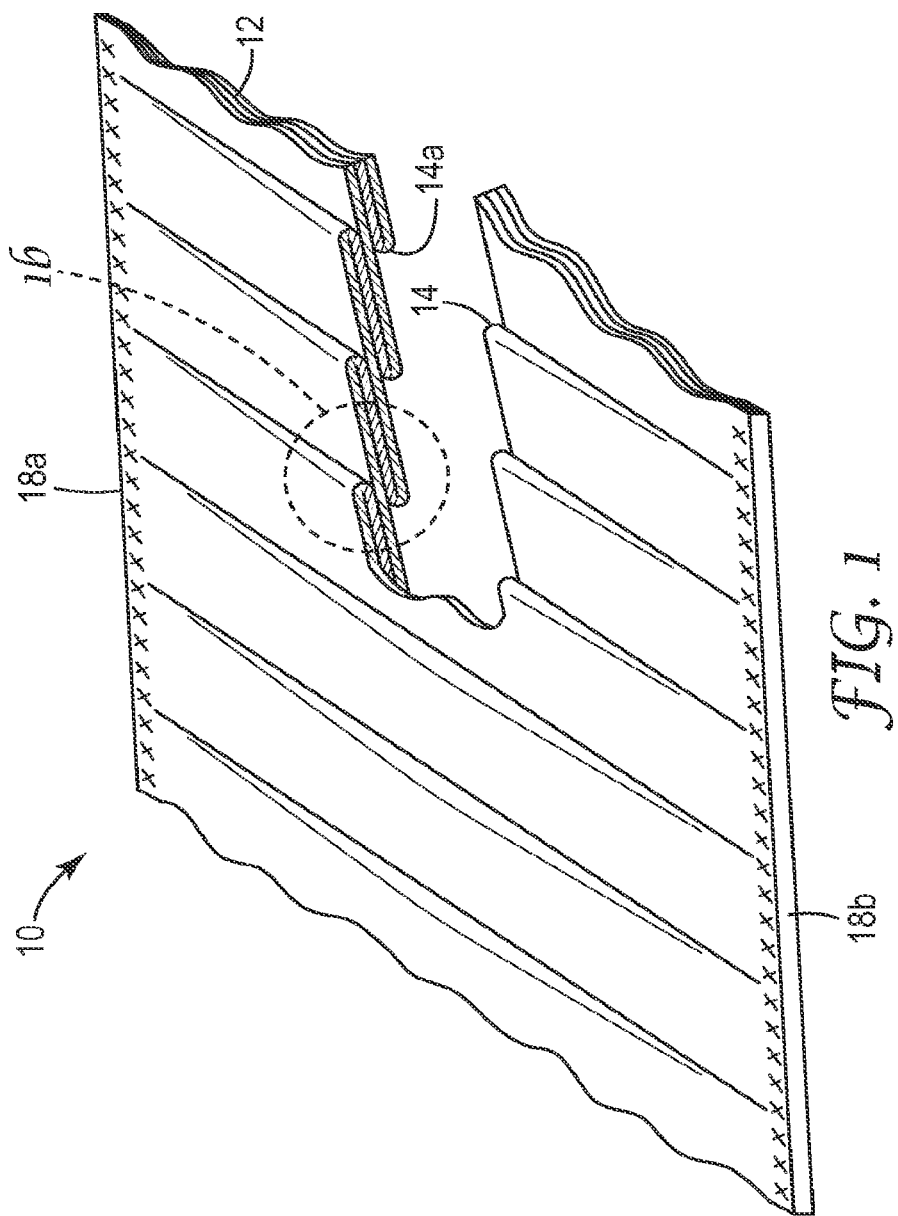

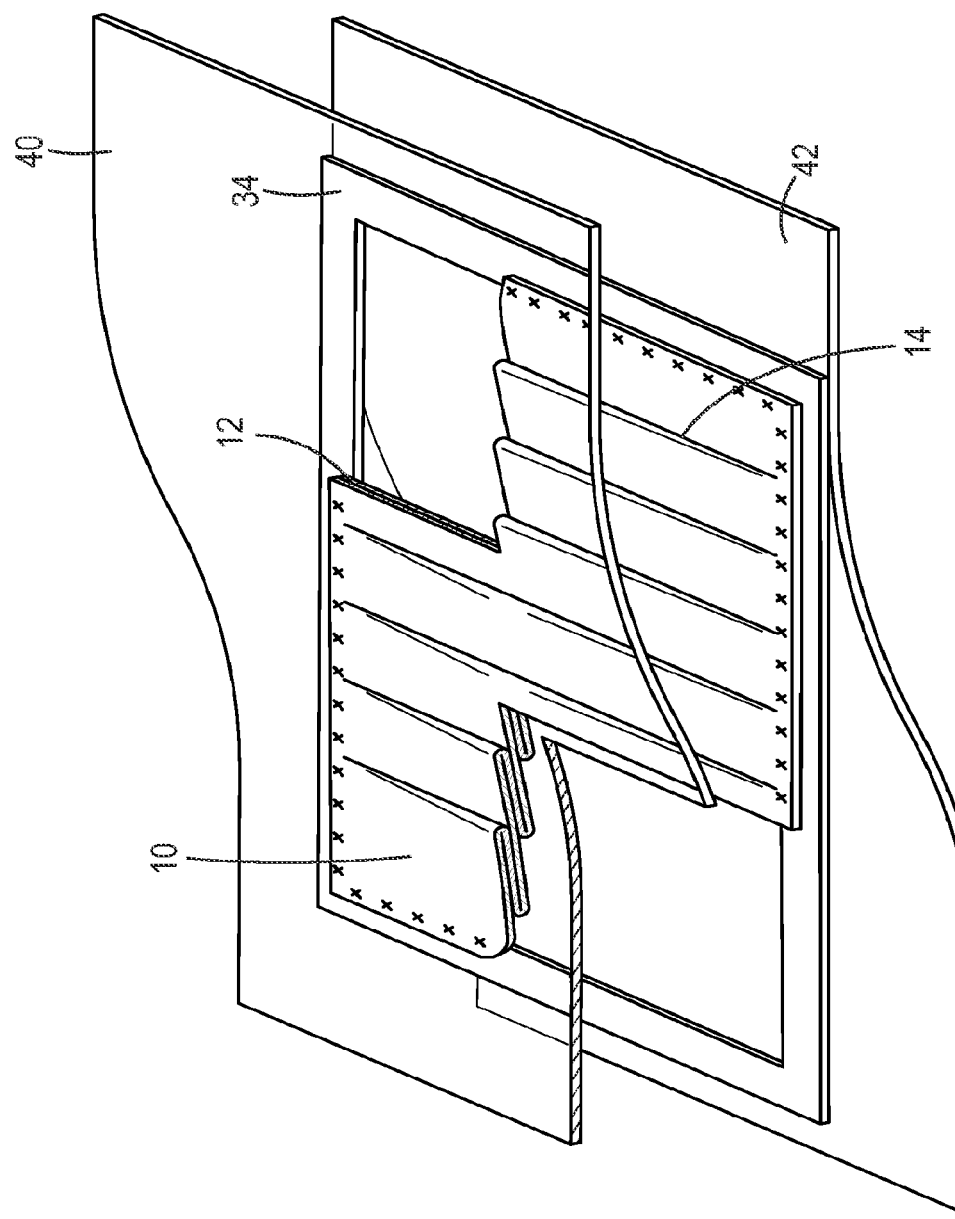

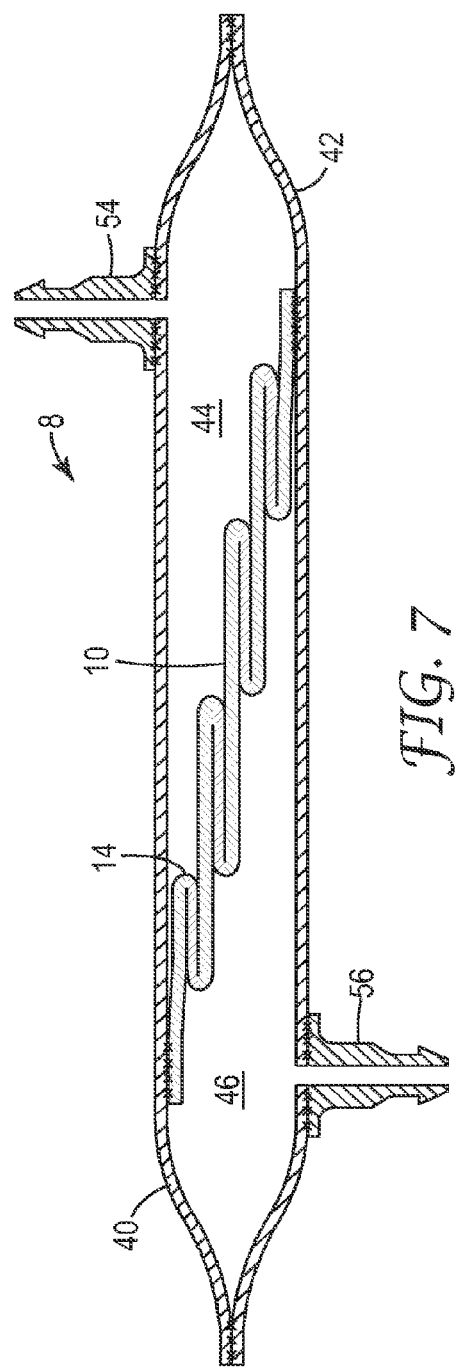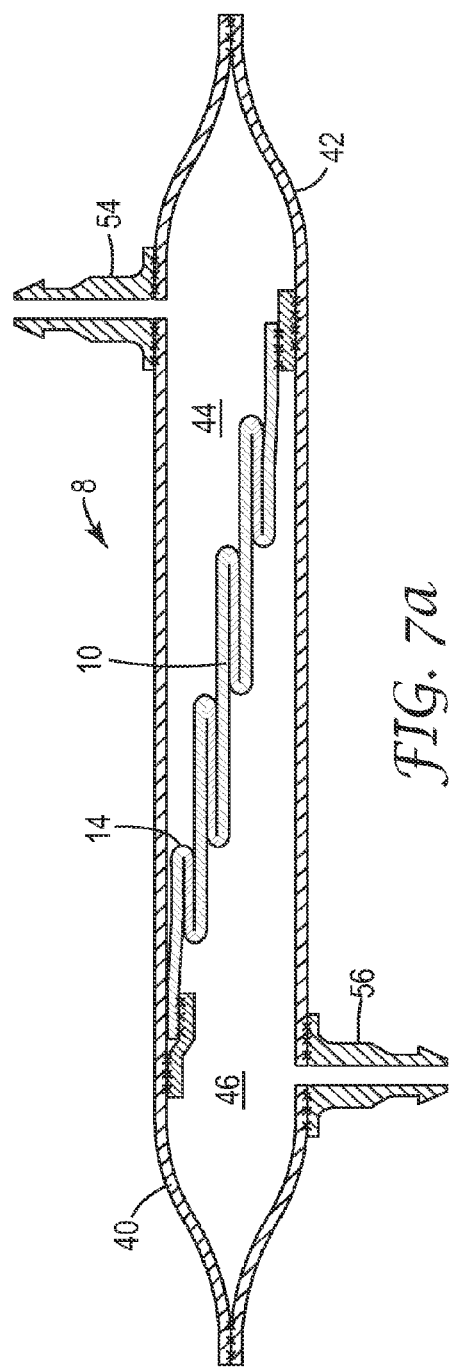

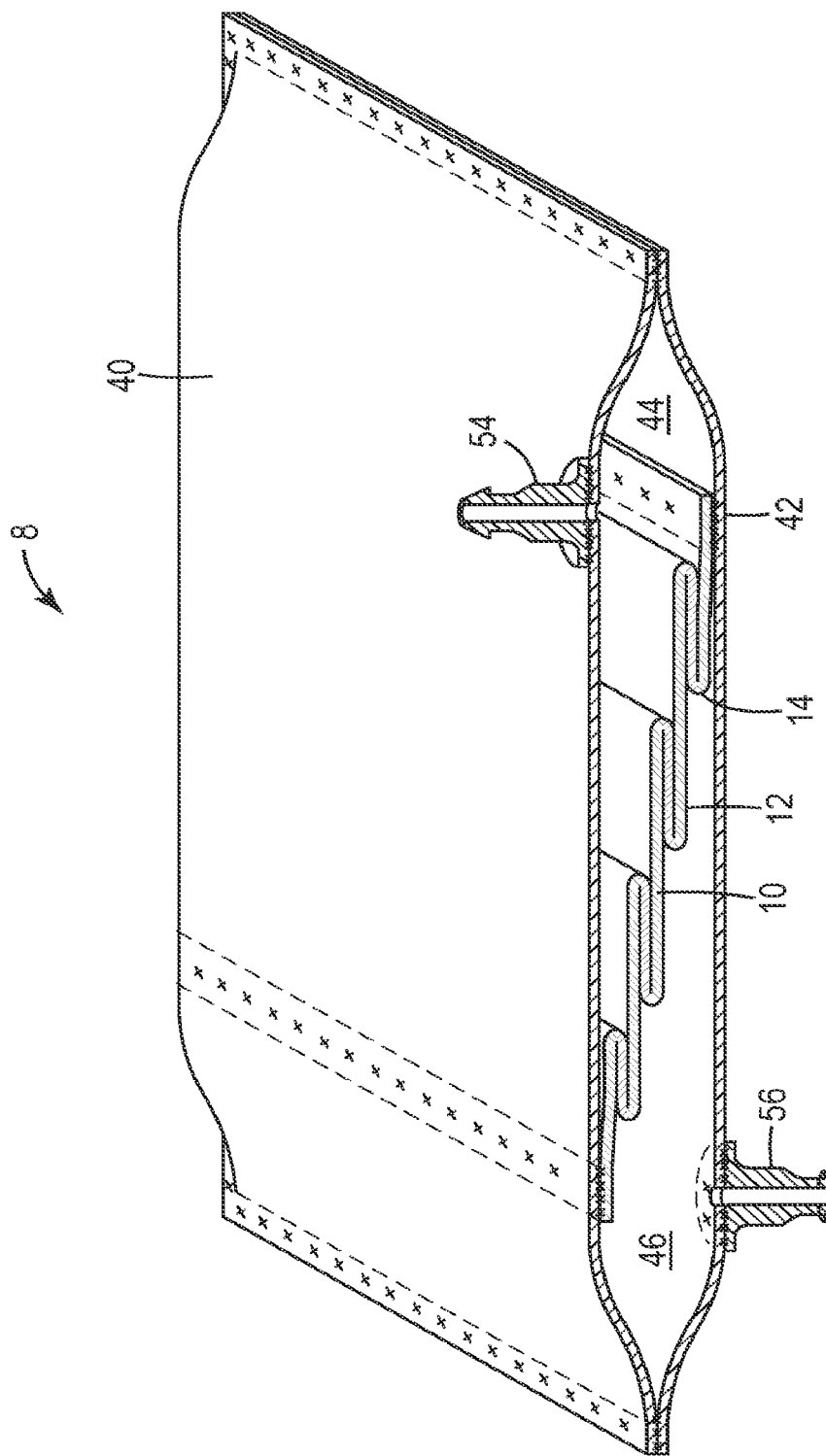

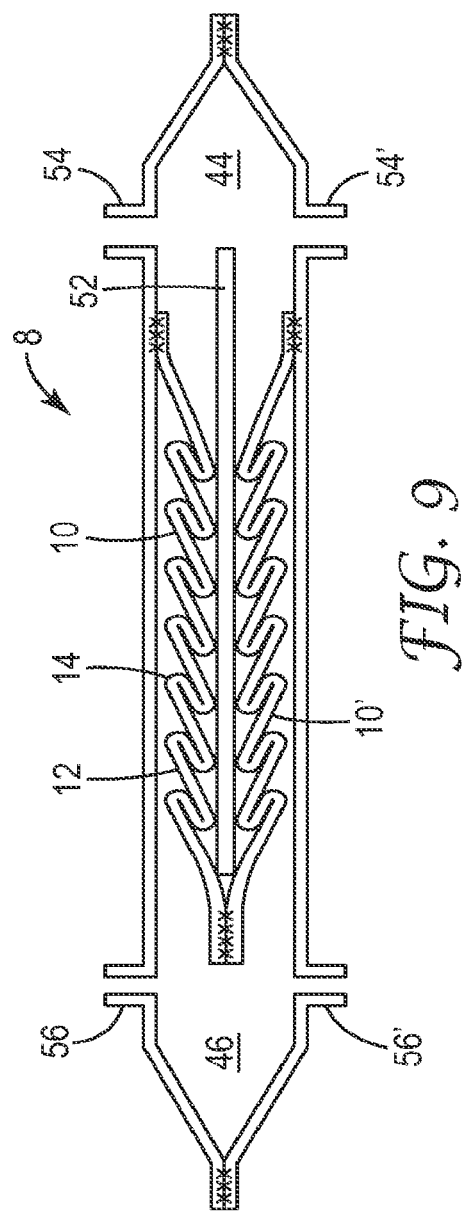
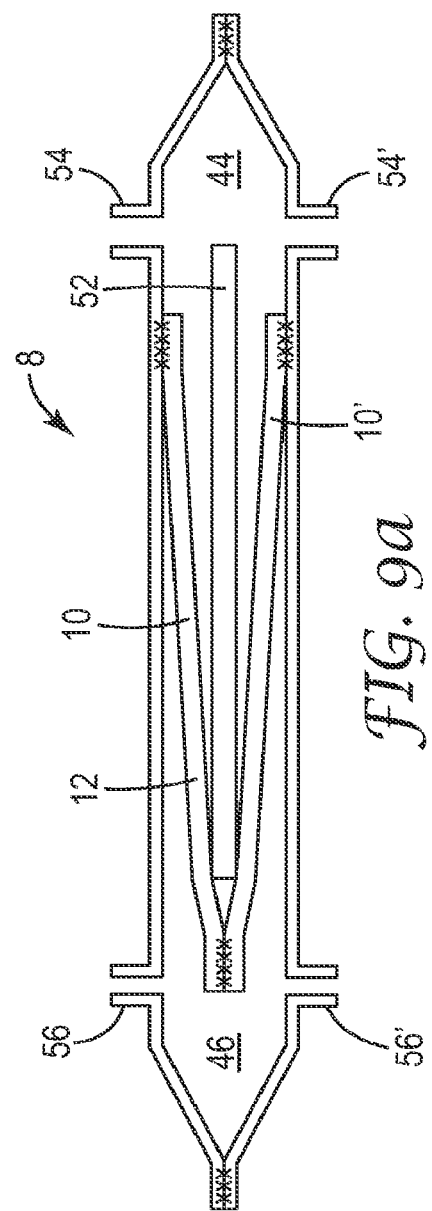
FIG. 9
FIG. 9a

FILTER DEVICE

CROSS-REFERENCE TO RELATED APPLICATIONS

This application is a divisional of U.S. patent application Ser. No. 12/809,194 filed on Jun. 18, 2010 as a national stage entry of PCT/US08/86923, filed on Dec. 16, 2008, which claims priority to U.S. Prov. Appln. No. 61/016,149, filed on Dec. 21, 2007, the disclosures of which are incorporated herein by reference in their entireties.

FIELD OF THE INVENTION

The present disclosure relates generally to a fluid filter device and methods of making and using the same. More particularly, the present disclosure relates to a disposable fluid filter device comprising a polymeric film.

BACKGROUND

There are currently a number of fluid filter products available for use in research, development, and manufacturing. Some of these products comprise some type of disposable filter media designed to decontaminate or sterilize a fluid source. The disposable filter media is typically disposed in a reusable metal housing. The metal housing contacts the fluid being processed and is typically cleaned or sanitized during filter media replacement. In order to reduce the risk of contamination between filter changes and product batch changes, disposable filter cartridges that eliminate fluid contact with a reusable housing have been developed. Such products are often relatively bulky and heavy, making them less desirable for handling. The relatively large size can also result in increased waste upon disposal of the product. Such products may also have hold up volumes (i.e., the fluid contained within the cartridge assembly during operation) that are difficult to reclaim upon completion of the filtering process.

Accordingly, there is a continuing need for disposable filter products that are easy to handle, cost effective, and reduce waste both directly (e.g., reduced filter media waste) and indirectly (e.g., reduced hold up volumes).

SUMMARY

The present disclosure relates generally to a fluid filter device and methods of making and using the same. More particularly, the present disclosure relates to a disposable fluid filter device comprising a polymeric film. The filter device of the present disclosure can reduce the size and amount of material used and disposed of in a filtering operation by replacing larger and less efficient filter elements with smaller and thinner filter elements.

The present application discloses a filter device having at least one filter media and at least first and second non-permeable films attached thereto. Some embodiments of further comprise at least one drainage substrate configured to enhance performance of the device. In some embodiments, at least one of the non permeable films further comprises at least one fluid communication port configured to allow fluid to enter or leave the filter device. The non-permeable films may be attached together to substantially planarly encapsulate the filter device. In some embodiments, the at least one filter media may be further attached to at least one substrate configured to provide support, further attachment area, or filtration, flow or drainage enhancement. In some embodiments, the filter media comprises planarly disposed pleats, although it is envisioned that a multitude of filter media configurations, for example, flat sheet media, could be successfully employed. Embodiments comprising multiple filter elements may be employed to further increase filtration surface area while maintaining a substantially flat configuration. Also disclosed are various apparatuses configured to contain and facilitate the use of embodiments of the disclosed filter device, although it is envisioned some embodiments of the disclosed filter device may be independently employed. It is to be understood that, while the disclosed filter device may be employed in a substantially flat configuration, some embodiments are of a flexible nature that may be manipulated to conform to a variety of alternatively shaped configurations.

These and other aspects of the disclosure will be apparent from the detailed description below. In no event, however, should the above summaries be construed as limitations to the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein:

FIG. 1 is a partial cutaway view of a filter element comprising a filter media having planarly disposed pleats having folds that are welded along parallel edges;

FIG. 5 is a partial cutaway view of a filter device showing how first and second non-permeable films may be positioned with respect to a filter element before being assembled to substantially planarly encapsulate the filter element;

FIG. 7 is a cross-sectional view of a filter device having fluid communication ports and a filter media comprising planarly disposed pleats;

FIG. 7a is a cross-sectional view of a filter device having fluid communication ports and a filter media comprising planarly disposed pleats, wherein the filter media is further attached to a framing substrate;

FIG. 8 is an isometric cutaway view of a filter device having fluid communication ports and a filter media comprising planarly disposed pleats;

FIGS. 9 and 9a are cross-sectional representations of filter devices having fluid communication ports, two filter elements, and a drainage substrate disposed between the filter elements;

FIGS. 12 and 12a show an overhead view and a partial cross-section of one example of a stackable member configured for use, for example, in the apparatus shown in FIG. 11.

DETAILED DESCRIPTION

FIG. 1 shows a substantially flat filter element 10 comprising at least one filter media 12 having planarly disposed pleats 14 having folds 14a. The filter media 12 may be formed of a single material or a composite of multiple materials that are suitable alone or in combination to meet various filtration, structural support, drainage, and flow requirements of a chosen application. Such materials may include, for example, membranes (e.g., nylon, polyethersulfone, polytetrafluoroethylene, polypropylene, and the like), non-wovens, polymeric meshes, apertured films, fibrous media (typically made by a wet laid paper making type operation with materials such as, for example, glass fibers, diatomaceous earth, perlite, cellulose, and binder resins), non-fibrous media, depth filter media, adsorptive media, charge modified media, or any other material found to have beneficial characteristics for a given application and that can be configured in a substantially flat filter element.

For example, the at least one filter media 12 may be formed of a single material. In other embodiments, the filter media 12 may be formed of multiple materials. In some cases, it may be desirable to form the filter media 12 of a composite of materials configured to provide improved pressure drop characteristics, such as by employing multiple materials having different degrees of porosity to selectively capture particulates and prevent premature loading or clogging of the filter media 12. In other embodiments, the at least one filter media 12 may be formed of multiple materials.

Figure 1A:
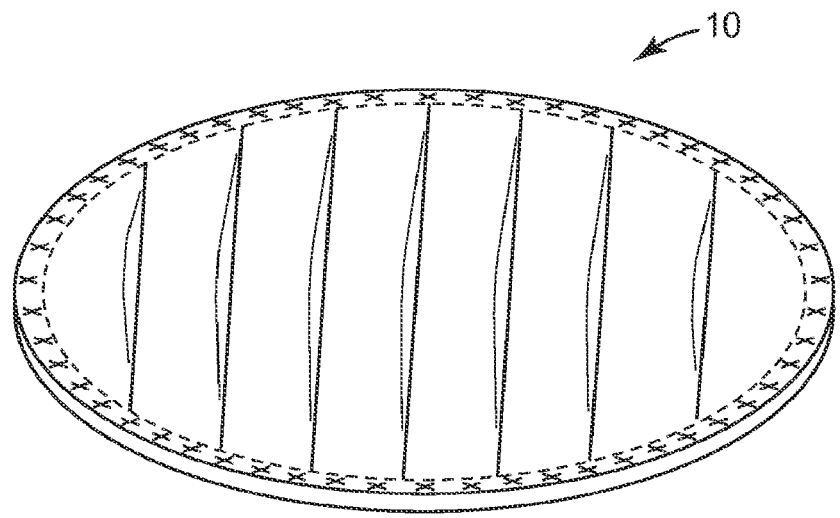
FIG. 1a is a non-rectangular filter element having planarly disposed pleats having folds that are welded along an edge.

In FIG. 1a, the filter element 10 is formed in a non-rectangular configuration. It is envisioned that various shapes of filter elements 10 may be desired, depending on the needs of a particular application. Such varying shapes may be formed, for example, by punching or otherwise cutting them out of a larger article of filter media 12 or by pleating pre-shaped filter media 12. Although the shape shown in FIG. 1a is circular, other shapes can also be utilized.

Figure 1B:
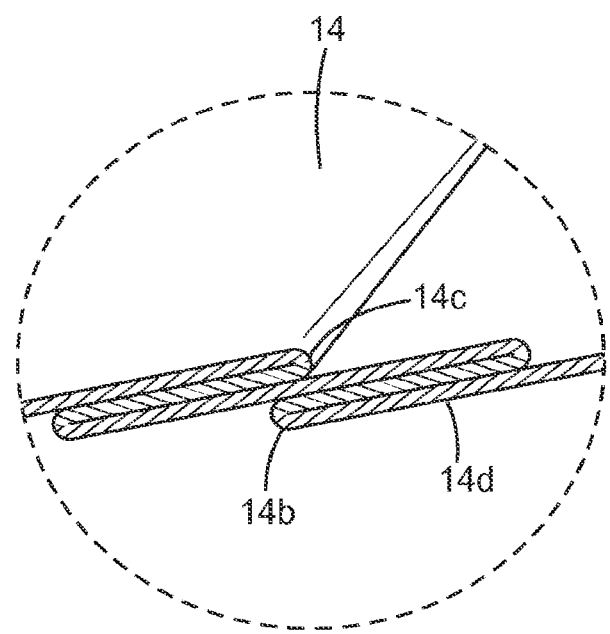
FIG. 1b is a cross-sectional view detailing one possible configuration of planarly disposed pleats.

FIG. 1b is a detailed view of one possible configuration for planarly disposed pleats 14. The planarly disposed pleats 14 may be configured such that the crown 14c of a given pleat rests at or near the root 14b of a corresponding pleat. The planarly disposed pleats 14 may also be configured such that the crown 14c of a given pleat rests substantially against the leg 14d of a corresponding pleat in no specific relation to the root 14b of a corresponding pleat. It is envisioned that, in some embodiments, the planarly disposed pleats 14 may exhibit a combination of the above configurations or even a random assortment of pleat sizes. In such configurations, the resulting pleated filter element 10 may have one, three, five, seven, nine, eleven, thirteen or even fifteen layers of filter media at any given cross-section, each layer of filter media comprising either a single filter material or a composite of multiple filter materials.

As used in the present disclosure, the term "pleat" refers to successive folds in a filter media forming first pleat legs having a first length and second pleat legs having a second length. Pleats may be formed with similar or dissimilar first and second leg lengths. Further, similar pleats may be uniformly distributed throughout a filter media or dissimilar pleats may be distributed in a repeating pattern or in an irregular or random pattern such that varying leg lengths are produced. The use of pleats in the filter media increases the amount of available surface area of the filter media in the filter device, and generally improves filter flow and throughput.

Figure 4:
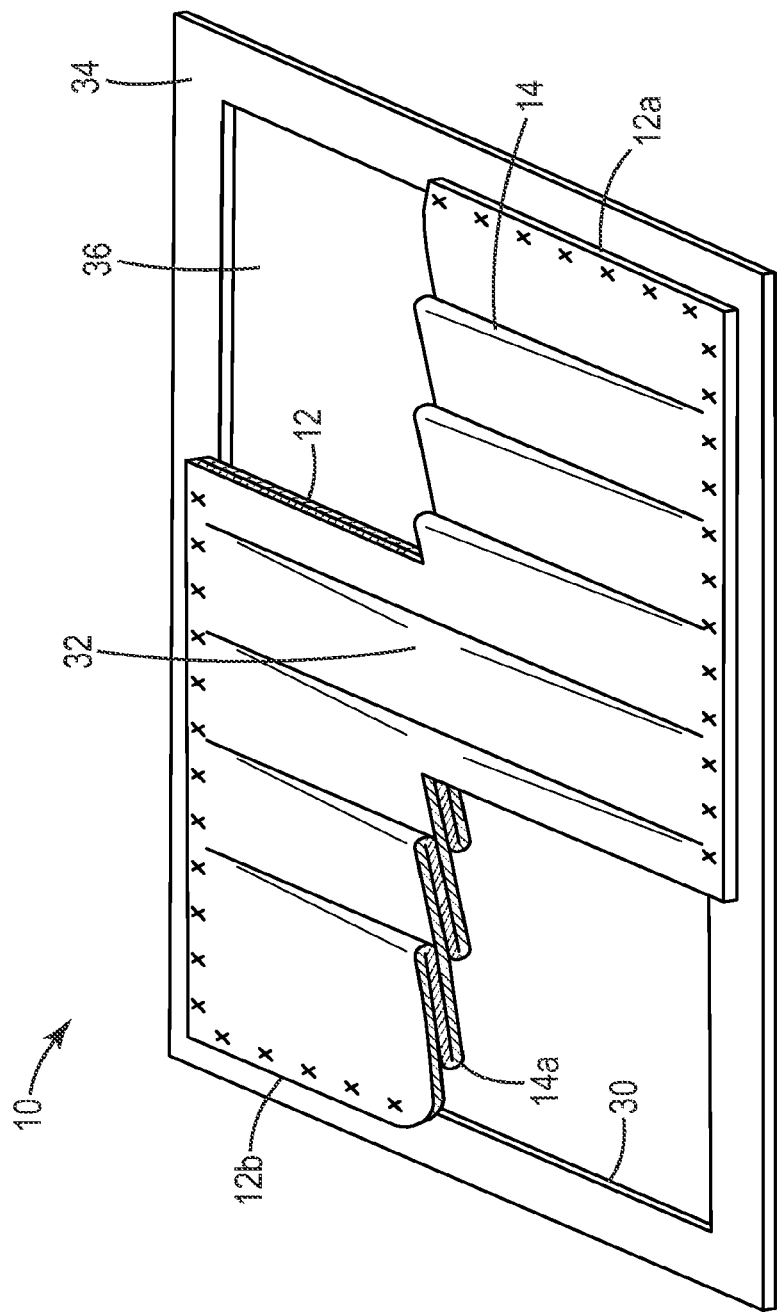
FIGS. 4-4b are a partial cutaway views of a filter element comprising a filter media having planarly disposed pleats having folds that are welded along each parallel edge and further along a first end and a second end, wherein the parallel edges and the first and second ends define a rectangular periphery that surrounds an operative filtration, wherein at least a portion of the rectangular periphery is further attached to a framing substrate, the framing substrate having one or more apertures permitting fluid communication with the operative filtration area.

It is envisioned that the substantially flat filter element 10 could be manufactured either in discrete lengths for incorporation into a filtration application, wherein the at least one filter media 12 has a first end 12a and a second end 12b as shown in FIG. 4, or in an essentially continuous form that be cut to length in a secondary operation. In some embodiments, it is envisioned that the substantially flat filter element 10 is welded along at least one edge 18a, 18b, each edge 18a, 18b being substantially parallel to the other and being substantially perpendicular to the folds 14a of the planarly disposed pleats 14. As used in the present disclosure, the term "weld" shall mean secured by any of various known polymer welding methods including, but not limited to, ultrasonic, high-frequency, vibration, friction, laser, solvent, contact, hot plate, plastic rod, speed tip, hot gas, and free hand.

Figure 2:
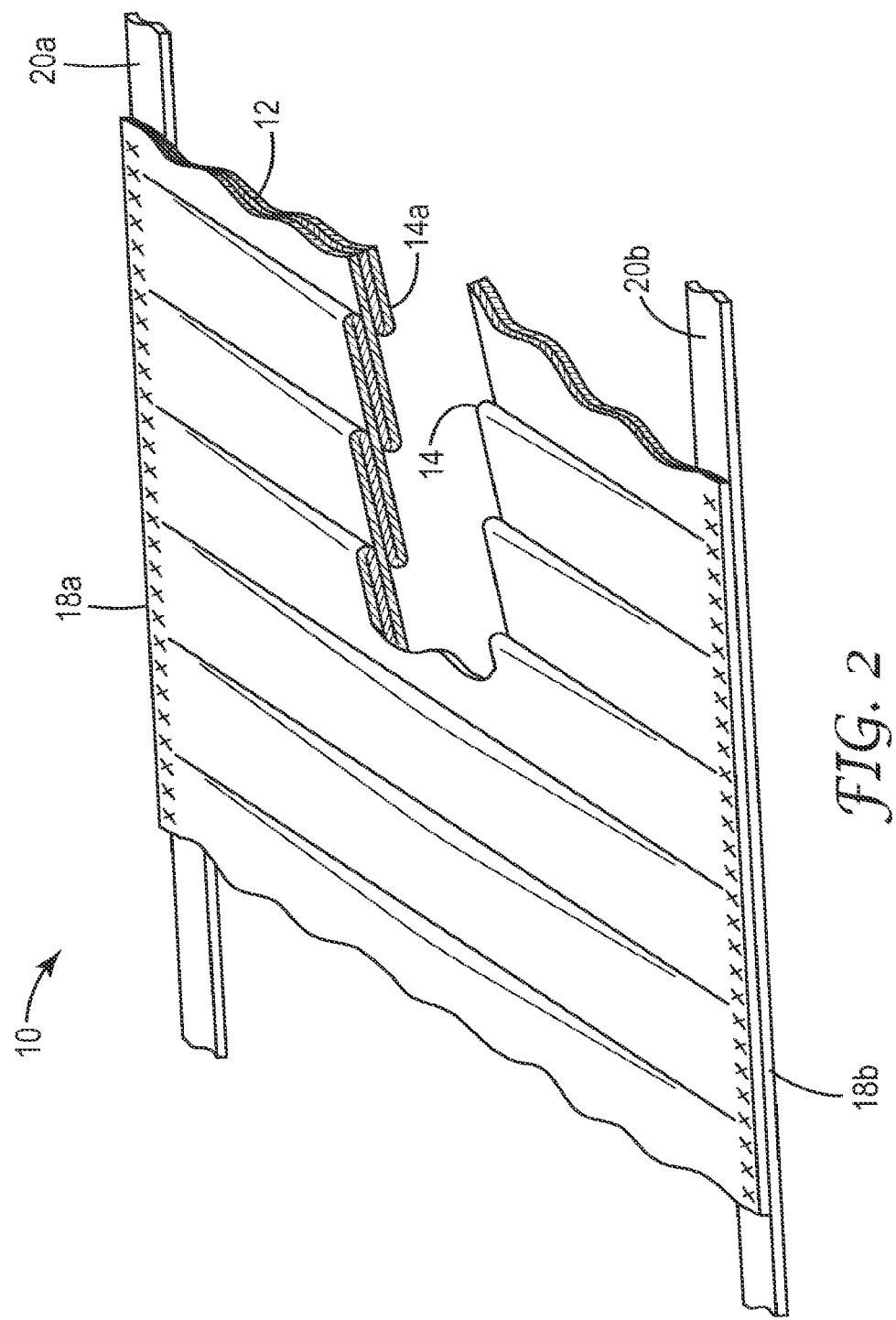
FIG. 2 is a partial cutaway view of a filter element comprising a filter media having planarly disposed pleats having folds that are welded along each edge, wherein each edge is further attached to a substrate.

In other embodiments, the folds 14a need not be perpendicular to edges 18a, 18b, such as where the filter element 10 is formed in a non-rectangular configuration. Where edges are welded, such welds may be substantially continuous, i.e., uninterrupted along the at least one edge 18a, 18b, or may be, for example, discrete tacks sufficient to hold each planarly disposed pleat 14 in a substantially flat configuration. In FIG. 2, the filter element 10 further comprises at least one substrate 20a that is further attached to the pleated filter media 12. Such at least one substrate 20a may be attached to the pleated filter media 12, for example, by welding, adhesives, stitching or any other attachment means defined in this application or suitable for the combination of materials employed. Such attachment may be continuous or intermittent along the length of the attachment, or may even consist of a single attachment point. The at least one substrate 20a may comprise a polymeric material that can be welded to the filter media 12. In some embodiments, the substrate 20a is non-permeable and is characterized as having a low water vapor transmission rate. The term "non-permeable" refers to a material that does not allow fluids to diffuse or pass through during reasonably expected operating conditions. The term "water vapor transmission rate" refers to the rate of water vapor transmission through the multilayer barrier composite as measured using the test described in ASTM F1249-01, (Standard Test Method for Water Vapor Transmission Rate Through Plastic Film and Sheeting Using a Modulated Infrared Sensor, Published December 2001), incorporated herein by reference. The substrate may comprise a single layer of material or may comprise multiple components, such as, for example, multilayer barrier composites. The term "multilayer barrier composite" refers to any combination of metal, plastic, or cellulosic layers (e.g., foils, films, and paper). The combination of metal, plastic, or cellulosic layers can include multiple layers of different materials, such as, for example, a metal combined with a plastic layer. The combination of metal, plastic, or cellulosic layers can also include multiple layers of similar materials, such as, for example, two layers of plastic. The layers can be combined substantially permanently using any processes known in the art, including, for example, coating, laminating, coextrusion, and deposition. Multilayer barrier films useful in the can comprise layers of low-density polyethylene, high-density polyethylene, polypropylene, polyester, and nylon. In some embodiments, a multilayer barrier film having a layer of metal, such as, for example, aluminum is used.

Figure 2A:
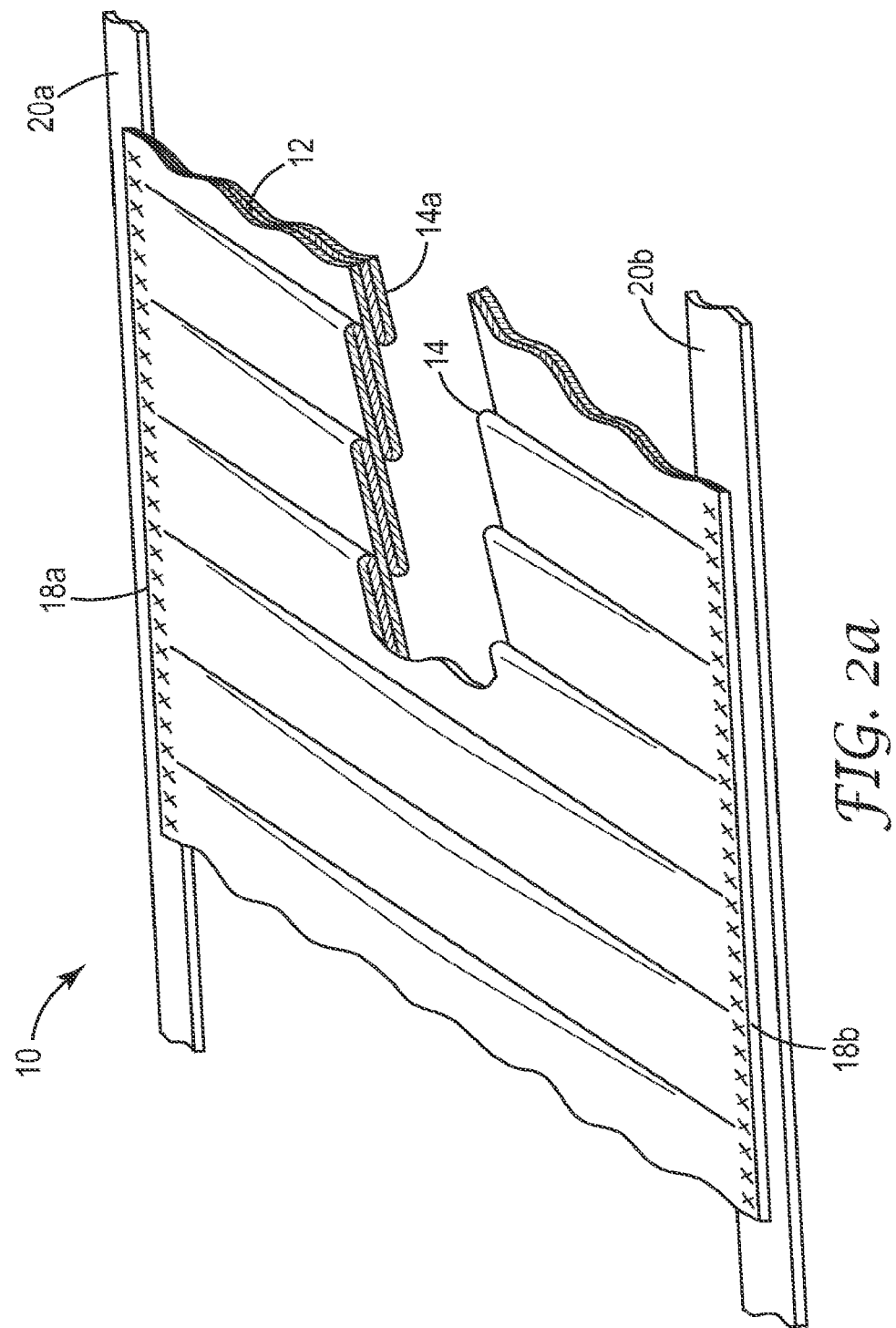
FIG. 2a is a partial cutaway view of a filter element comprising a filter media having planarly disposed pleats having folds that are welded along each edge, wherein each edge is further attached to a substrate that extends beyond the width of the filter media.

In some embodiments, such as in FIG. 2a, an edge of the at least one substrate 20a extends beyond an edge 18a of the pleated filter media 12. In other embodiments, such as in FIG. 2, an edge of the at least one substrate 20a is flush with an edge 18a of the pleated filter media 12. In embodiments where the at least one substrate 20a extends beyond an edge 18a of the pleated filter media 12, a non-porous material for the at least one substrate 20a can be employed. It is envisioned that a second at least one substrate 20b may be attached to an opposite edge 18b of the pleated filter media 12, as shown in FIGS. 2 and 2a. In such embodiments comprising multiple substrates 20a, 20b, such substrates 20a, 20b may be attached by same or different means, may comprise same or different materials, may each comprise an edge that is flush with an edge 18a, 18b of the pleated filter media 12, and may extend beyond an edge 18a, 18b of the pleated filter media 12 by same or different amounts, including embodiments where one substrate 20a or 20b is flush with an edge 18a, 18b of the pleated filter media 12 and a second substrate 20a or 20b extends beyond an edge 18a, 18b of the pleated filter media 12.

Figure 3:
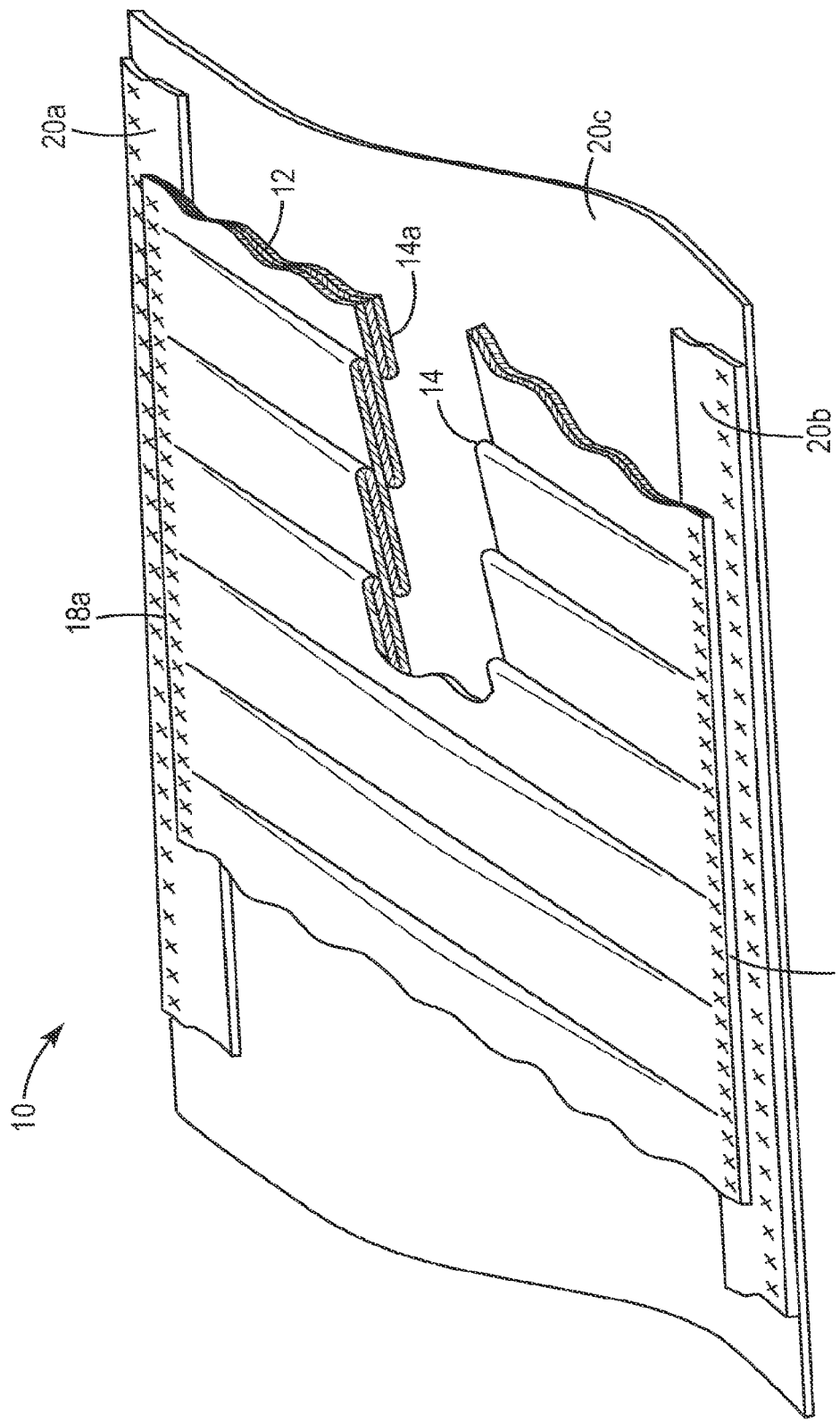
FIG. 3 is a partial cutaway view of a filter element comprising a filter media having planarly disposed pleats having folds that are welded along each parallel edge, wherein each parallel edge is further attached to at least one substrate that extends beyond the width of the filter media, the at least one substrate in this case comprising a first and second substrate attached along the parallel edges of the filter media, along with a third substrate attached to the first and second substrates.

As shown in FIG. 3, a third substrate 20c may be further attached to one or both of the at least first and second substrates 20a, 20b. In some embodiments, the third substrate 20c, if employed, can be composed of a non-porous material. In other embodiments, the third substrate 20c may be composed of a porous material configured to permit fluid flow therethrough. The third substrate 20c, when employed, may be attached to the filter element 10 by any means discussed in this disclosure, or any other reasonable means known to those in the art consistent with the materials chosen and the applications desired. Such attachment means may be the same or different from any attachment means employed to secure substrates 20a and 20b to the filter element 10.

As shown in FIG. 4, the pleated filter media 12 may further, or alternatively, be provided with a framing substrate 34. The framing substrate 34, when provided, may allow for more robust attachment of the filter element 10 to another substrate or another article than would otherwise be attained when, for example, employing very porous or relatively fragile materials in filter media 12. Further, or alternatively, the framing substrate 34 may provide varying degrees of rigidity to the filter element 10 for applications where a certain degree of structural stiffness is desired. In other embodiments, the framing substrate 34 may be configured to allow a high degree of flexibility of the filter element 10.

In some embodiments, at least a portion of the framing substrate 34 is attached directly to at least a portion of the pleated filter media 12. In other embodiments, at least a portion of the framing substrate 34 is attached to at least a portion of at least one substrate 20a, 20b, which may be directly attached to at least a portion of the pleated filter media 12. In still other embodiments, at least a portion of the framing substrate 34 is attached to at least a portion of a third substrate 20c, which is attached to at least one first or second substrate 20a, 20b, which may be directly attached to at least a portion of the pleated filter media 12. In appropriate applications and embodiments, the framing substrate 34 may be continuously or intermittently attached about a periphery 30 surrounding an operative filtration area 32.

In some embodiments, the framing substrate 34 may be composed of a single, continuous member. In other embodiments, a framing substrate 34 may be constructed of multiple members and subsequently assembled in a suitable framing configuration. Such a multiple-member framing substrate 34 may be, for example, easier or more efficient to manufacture, depending upon the capabilities of the fabrication means employed.

Figure 4B:
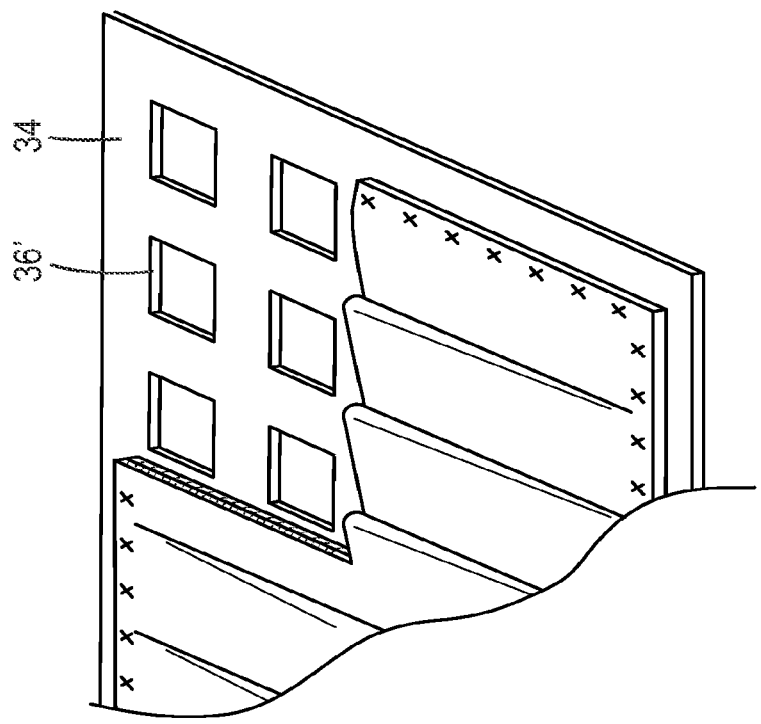
Figure 4A:
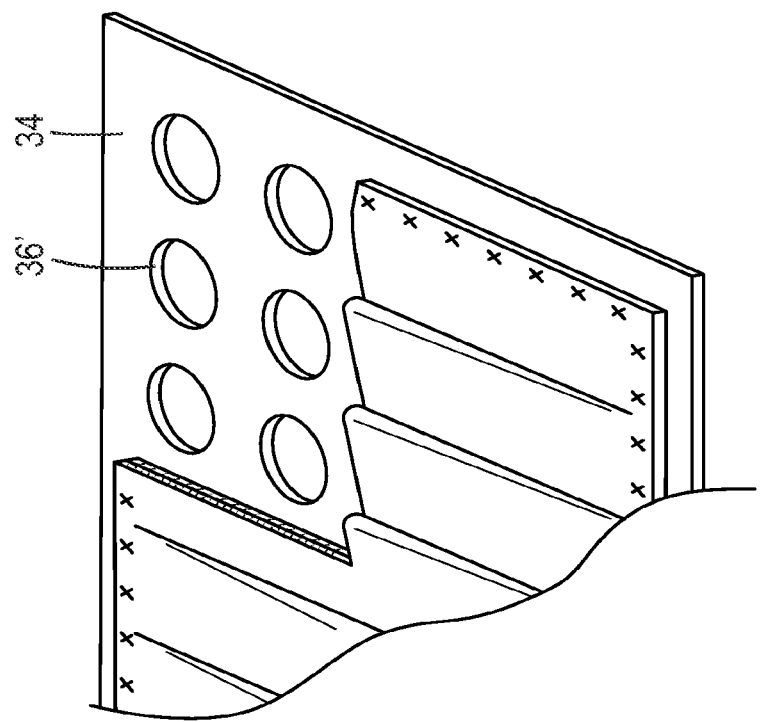

In the framing substrate 34, within the periphery 30, there may be a single aperture 36 or multiple apertures 36' enabling fluid communication through the framing substrate 34 to the pleated filter media 12. Such apertures 36 or 36' may be configured in a manner similar to a typical picture frame as in FIG. 4, wherein four sides surround a single rectangular opening 36. In some embodiments, the opening or openings in the framing substrate 34 may be, for example, circular in shape as in FIG. 4a or rectangular in shape as in FIG. 4b. It is also envisioned that there may be multiple openings of similar or different shapes in the framing substrate 34. In one embodiment, openings in the framing substrate 34 comprise a mesh, for example, as may be provided with an extruded polymer mesh or an apertured film. Such mesh, or any combination of aperture or apertures, may be configured with any reasonable porosity calculated or believed to provide suitable flow characteristics for the desired application.

FIG. 5 is a partial cutaway view of a filter device before being assembled to encapsulate the filter element. In some embodiments, such as that shown in FIG. 5, the filter element 10 comprises at least one filter media 12 having planarly disposed pleats 14. The filter element 10 may be further attached to a framing substrate 34 and encapsulated between first and second non-permeable films 40, 42, respectively. The non-permeable films 40, 42 shown in FIG. 5 are transparent, in other embodiments the films may be opaque. The non-permeable films may comprise a polymeric material that can be welded to other components of the filter device. In some embodiments, the non-permeable film is characterized as having a low water vapor transmission rate. The non-permeable film may comprise a single layer of material or may comprise multiple components, such as, for example, multilayer barrier composites. The term "multilayer barrier composite" refers to any combination of metal, plastic, or cellulosic layers (e.g., foils, films, and paper). The combination of metal, plastic, or cellulosic layers can include multiple layers of different materials, such as, for example, a metal combined with a plastic layer. The combination of metal, plastic, or cellulosic layers can also include multiple layers of similar materials, such as, for example, two layers of plastic. The layers can be combined substantially permanently using any processes known in the art, including, for example, coating, laminating, coextrusion, and deposition. Multilayer barrier films useful in the can comprise layers of low-density polyethylene, high-density polyethylene, polypropylene, polyester, and nylon. In some embodiments, a multilayer barrier film having a layer of metal, such as, for example, aluminum is used. In some embodiments, at least one drainage substrate may further be provided. In such cases, the drainage substrate may be disposed in substantial contacting relation to either the filter media 12, the framing substrate 34, or both, though the drainage substrate need not be in contact with either to maintain function.

Figure 6:
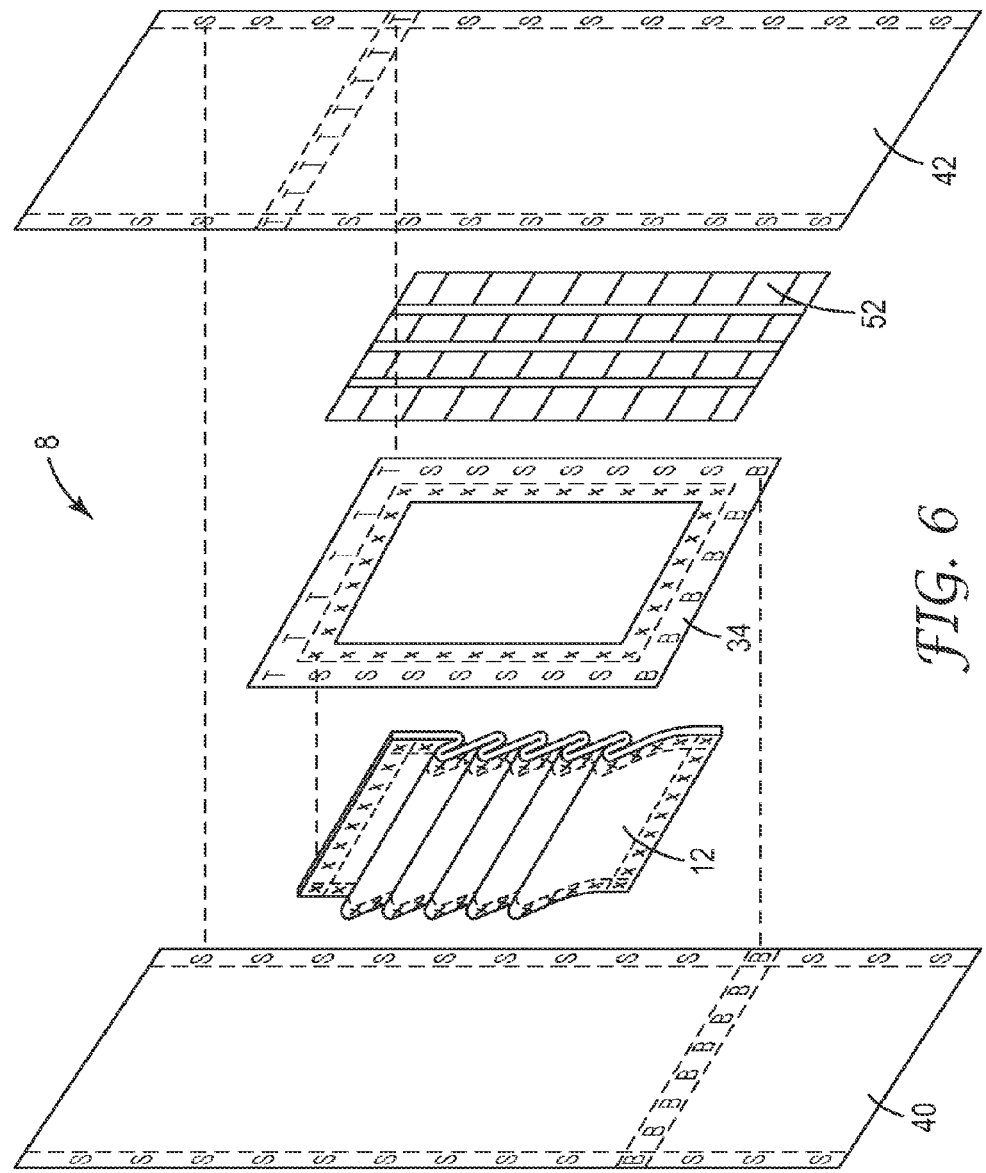
FIG. 6 is an exploded view of a filter device showing a possible disposition of first and second non-permeable films, a filter media, a framing substrate and a drainage substrate.

In FIG. 6, an exploded view of a filter device 8 illustrates one possible relative disposition of first non-permeable film 40, filter element 10 having a framing substrate 34, drainage substrate 52, and second non-permeable film 42. Dashes witness lines therein illustrate an example of desired attachment locations of the various components of the filter device 8. For example, in some embodiments, portions of the first non-permeable film 40 labeled "S" will attach to portions of the second non-permeable film 42 that are also labeled "S", and so on. It is to be understood that the exemplary attachment locations as illustrated in FIG. 7 represent only one possible assembly configuration for a filter device 8. The actual components selected, the physical disposition of those components, and relative attachment locations may vary depending on the materials selected and the desired application.

FIG. 7 is a cross-sectional view of a filter device 8 having fluid communication ports 54, 56, and a filter element 10 comprising planarly disposed pleats 14. As shown in FIG. 7, the filter element 10 is attached on one end to a first non-permeable film 40 and at the opposite end to a second non-permeable film 42. The first and second non-permeable films are sealed at their peripheries to create two chambers 44, 46 divided by the filter element 10. The first fluid communication port 54 is attached to the first non-permeable film 40 to create a fluid connection to the first chamber 44. The second fluid communication port 56 is attached to the second non-permeable film 42 to create a fluid connection to the second chamber 46. During use, a source fluid enters the first fluid communication port 54, enters first chamber 44, passes through filter media 12 where it is filtered. The filtrate then enters second chamber 46 and exits the filter device 8 through the second communication port 56. The communication ports 54, 56 can be any design known in the art, and can be designed to allow multiple filter devices 8 to be connected directly to one another. In other embodiments, the communication ports are configured to connect to tubing. In some embodiments, the first and second communication ports are different and provide an operator aid in identifying which communication port is to be used as an inlet and which is an outlet. In some embodiments, the filter device 8 is designed to operate with either communication port being an inlet or outlet.

FIG. 7a is a cross-sectional view of a filter device 8 having fluid communication ports 54, 56 and a filter element 10 comprising planarly disposed pleats 14 of filter media 12 attached to a framing substrate 34. As shown in FIG. 7a, the framing substrate 34 may be used to attach the filter element 10 to the first and second non-permeable films 40, 42. The use of a framing substrate 34 may facilitate handling of the filter media 12. The use of a framing substrate 34 may also assist in attaching the filter media 12 to the first and second non-permeable films 40, 42. If, for example, a filter media 12 is used that has multiple components, one surface of the filter media 12 may provide a better attachment anchor than the other. As shown in FIG. 7a, the framing substrate 34 is attached to one surface of the filter media 12. The framing substrate 34 shown in FIG. 7a also allows for the attachment interface of the filter element 10 to be in a compressive state during use. For example, if first fluid communication port 54 is used as an inlet, the first chamber 44 will operate at a higher pressure than the second chamber 46 because of the pressure drop caused by the filter media 10. Accordingly, the higher pressure of first chamber 44 will cause the filter media 10 to be compress against the framing substrate 34.

FIG. 8 is an isometric cutaway view of a filter device having fluid communication ports 54, 56, and a filter element 10 comprising a filter media 12 with planarly disposed pleats 14. As shown in FIG. 8, the first and second non-permeable films 40, 42 are sealed at their peripheries to create two chambers 44, 46 divided by the filter element 10.

FIGS. 9 and 9a are cross-sectional representations of filter devices having multiple fluid communication ports 54, 54', 56, 56', two filter elements 10, 10', and a drainage substrate 52 disposed between the filter elements 10, 10'. A shown in FIG. 9, the filter element 10 can comprise filter media 12 with planarly disposed pleats 14. As shown in FIG. 9a, the filter element can comprise planar filter media 12. The planar filter media 12 can comprise multiple pieces joined together as shown in FIG. 9a, or a single folded piece. As shown in FIGS. 9 and 9a, two communication ports can be used to connect to each of the chambers 44, 46 to facilitate parallel filtration if multiple filter devices are employed.

Figure 10:
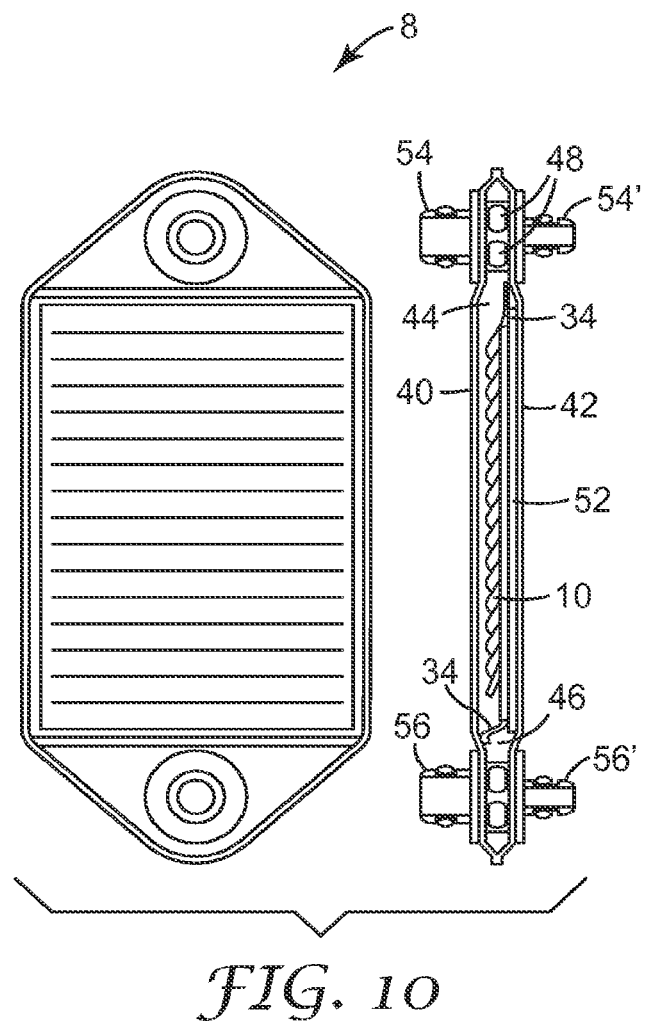
FIG. 10 shows perpendicular views of an exemplary filter device.

FIG. 10 shows a front and cross-sectional side view of an exemplary filter device 8. As shown in FIG. 10, the filter device 8 comprises fluid communication ports 54 54', 56, 56' and a filter element 10 comprising planarly disposed pleats of filter media attached to a framing substrate 34. As configured in FIG. 10, fluid communications ports 54 and 54' function as inlet ports, and fluid communication ports 56 and 56' function as outlet ports, relative to the filter element 10. The first and second non-permeable films are sealed at their peripheries to create two chambers 44, 46 divided by the filter element 10. A drainage substrate 52 is positioned in chamber 46 between the filter element 10 and the second non-permeable film 42. As chamber 46 is downstream of chamber 44, the differential pressure created by the filter element 10 may force the filter element 10 toward the second non-permeable film 42. The drainage substrate 52 is positioned between the filter element 10 and the second non-permeable film to help promote fluid flow from the filter element 10 toward the fluid communication ports 56, 56'.

As shown in FIG. 10, the fluid communication ports 54 may be configured to allow connection to additional filter devices 8. The fluid communication ports 54 may be designed to be male and female mating parts with integral seals, such as shown in FIG. 10. In some embodiments, the fluid communication ports 54 connected to one chamber form a single rigid body that extends from the first non-permeable film 40 to the second non-permeable film 42. In such embodiments, the fluid communication port may comprise multiple pieces that are joined together with at least one fluid passage 48 that allow fluid flow from the fluid communication port 54 to the chambers 44. The use of a single rigid body may provide additional integrity in affixing the communication ports 54 to the first and second non-permeable films 40, 42. The use of a single rigid body may also provide improved handling capabilities when configuring the filter device for operation (e.g., connecting the communication ports).

Figure 11:
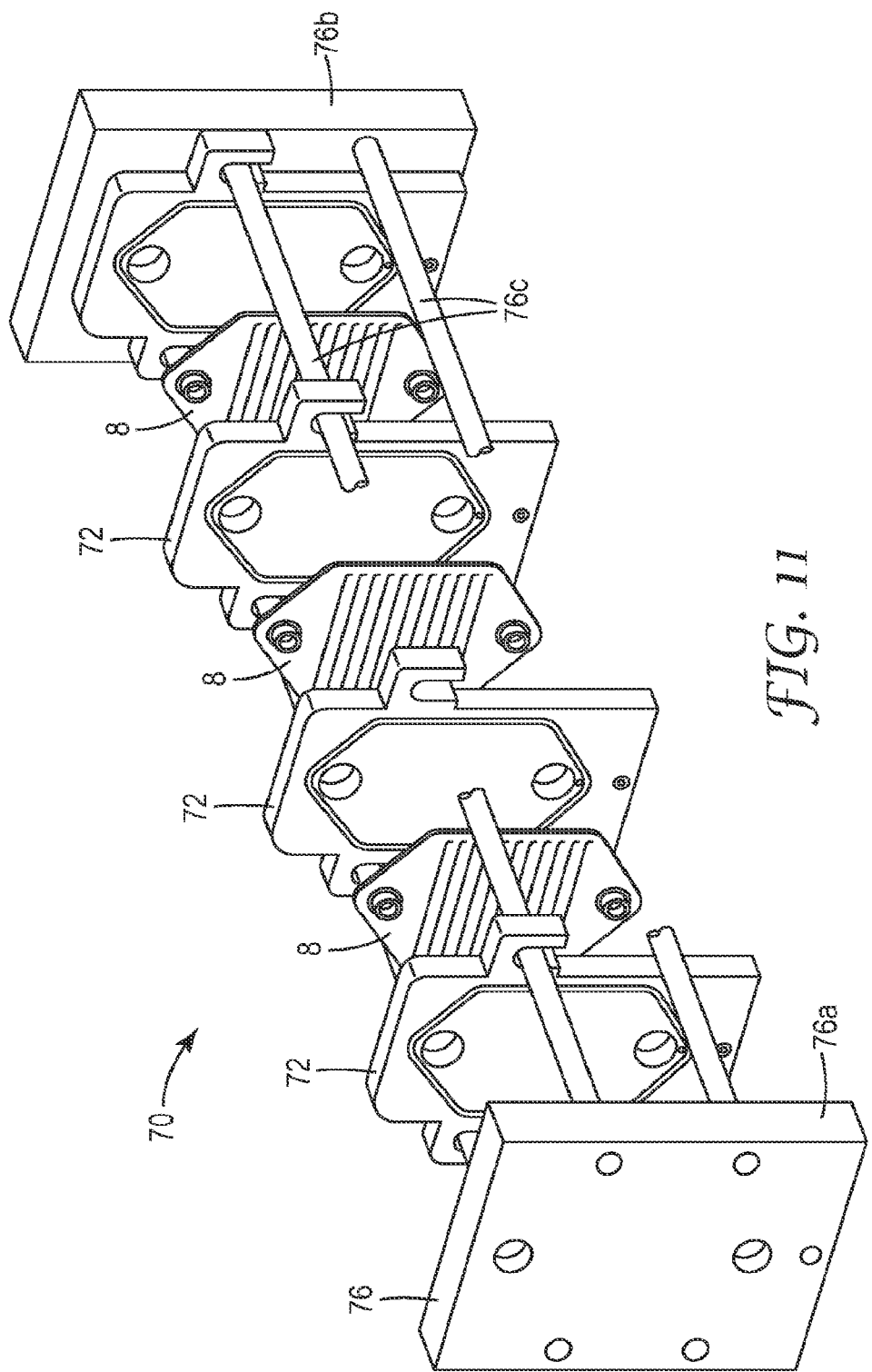
FIG. 11 is an exploded view of an apparatus comprising stackable members configured to contain at least one filter device.

FIG. 11 is an exploded view of an apparatus 70 comprising stackable members 72 configured to contain at least one filter device 8. As shown in FIG. 11, the apparatus 70 comprises a clamping device 76 having a first end wall 76a, a second end wall 76b, and clamping members 76c configured to draw the end walls 70a, 70b toward one another. The stackable members 72 have hangers 82 configured to accept the clamping members 76c to help support and locate the stackable members 72. Other clamping devices and stackable member positioning devices and methods may be employed, including for example, other known plate and frame assemblies. The clamping device can be any apparatus configured to hold a member and apply a compressive force thereto. Examples of suitable compressive forces include, but are not limited to, those provided by screws, hydraulic cylinders, pneumatic cylinders, cam levers, magnets, and gravity. The embodiment shown in FIG. 11, includes three filter devices 8 (similar to that shown in FIG. 10) located between four stackable members 72.

The stackable members 72 are generally configured with a depressed area that provides a cavity when two stackable members are placed in intimate contact. The stackable member cavity is configured to provide mechanical support for the filter device 8. In some embodiments, the stackable member cavity is configured to be slightly smaller than the outer geometry of the filter device 8 to eliminate any unsupported areas for the first and second non-permeable films 40, 42. The stackable members 72 can all be identical as shown in FIG. 11, or can vary to accommodate different filter device 8 geometries.

Figure 12:
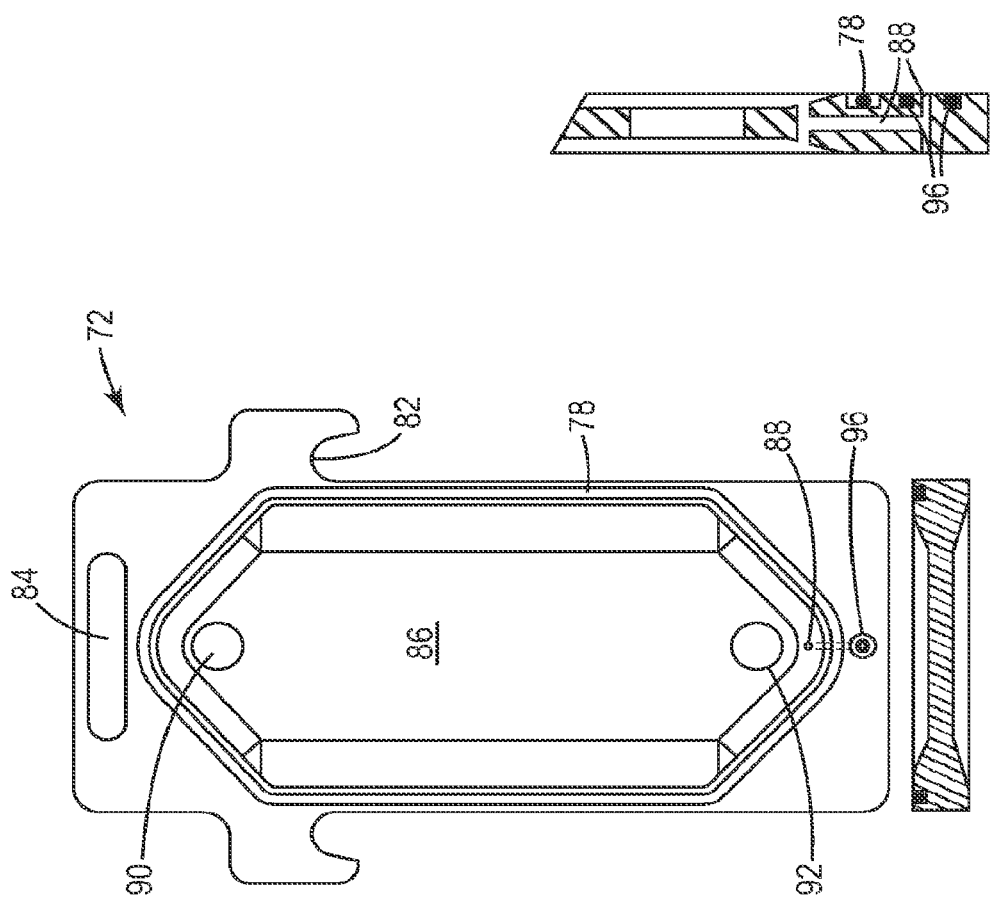

FIGS. 12 and 12a show an overhead view and a partial cross-section of one example of a stackable member 72 configured for use, for example, in the apparatus 70 shown in FIG. 11. The stackable member 72 has a handle 84, hangers 82, a pressure port 88, a sealing member 78, and a cavity 86. The cavity 86 has apertures 90, 92 that are configured to accommodate the fluid communication ports of the filter device.

The pressure port 88 is in fluid communication with cavity 86 and allows pressure and/or vacuum to be applied to the exterior of the filter device 8 within the cavity 86. The application of pressure to the exterior of the filter device can be used to promote evacuation of the filter device. Likewise, the application of vacuum to the exterior of the filter device can be used to promote filling of the filter device. The sealing member 78 along with pressure port seal 96 create a fluid seal between the exterior surface of the filter device and atmosphere The pressure applied to the exterior of the filter device through pressure port 88 can be created with liquid or gas. In some embodiments, the liquid or gas can be introduced at a desired temperature.

The stackable members can be made from any materials that can withstand the expected operating pressures, including metal in high pressure operations, and plastic in lower pressure operations. Since the stackable members are predominantly in a compressive state within the clamping device, plastic is suitable for many applications. In some embodiments, the stackable members are made from a transparent plastic that allows the operator to visually inspect the filter devices and related connections during operation.

Figure 13:
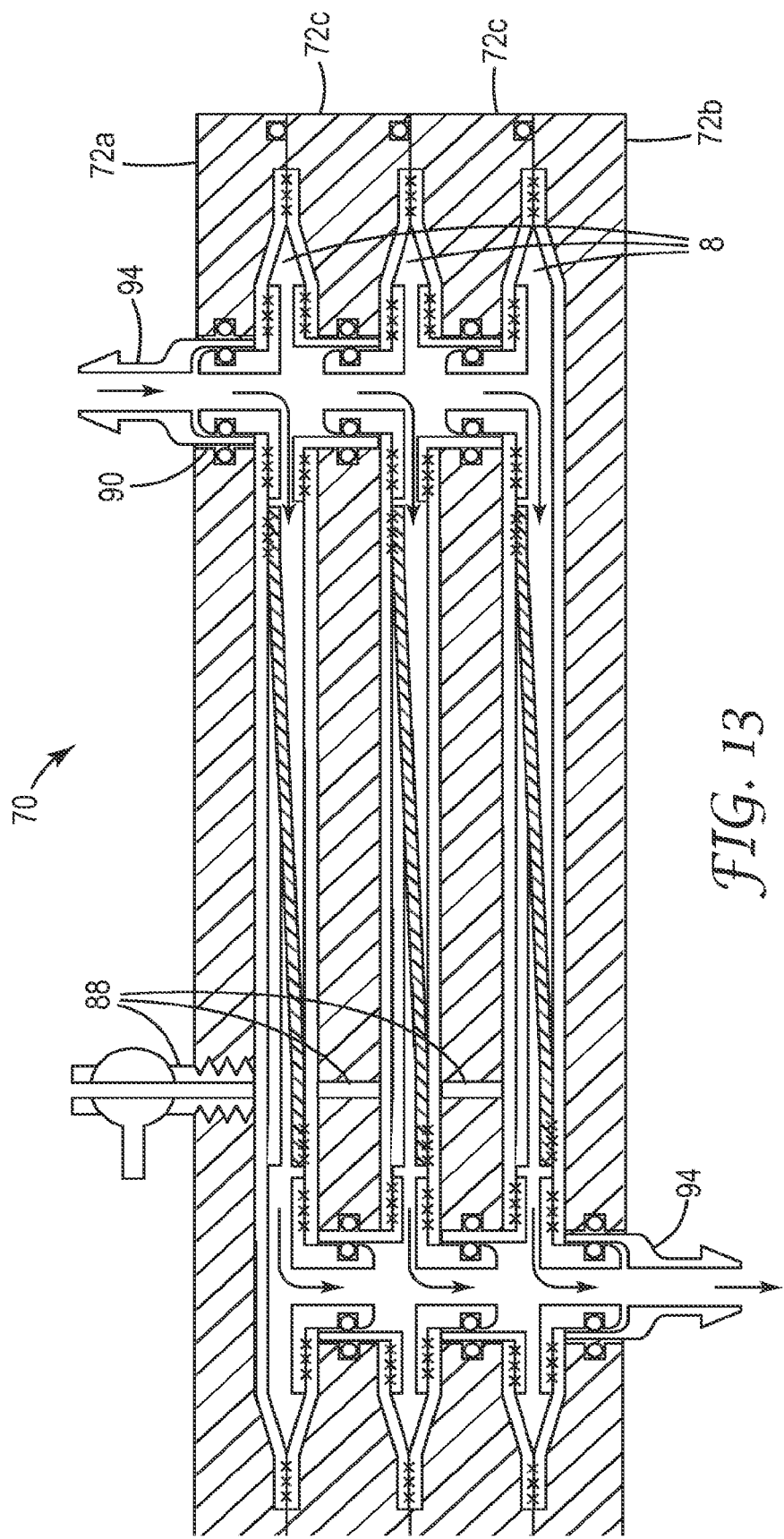
FIG. 13 is a detailed cross-section of one embodiment of an apparatus configured to contain at least one filter device.

FIG. 13 is a detailed cross-section of one embodiment of an apparatus 70 configured to contain three filter devices 8 with arrows showing the general direction of fluid flow. As shown in FIG. 13, the first end stackable member 72a has a first aperture 90 and a pressure port 88. A connection device 94 is used to extend the fluid communication port of the filter device beyond the stackable member 172a. Opposite the first end stackable member 72a, is the second end stackable member 72b. The second end stackable member 72b also has a connection device 94 associated with the opposite fluid communication port of the filter device. Between the first and second end stackable members, are two middle stackable members 72c. Any number of middle stackable members can be used to accommodate the desired number of filter devices.

As shown in FIG. 13, the filter devices can be configured for parallel flow. In other embodiments, the fluid communication ports of the filter device are configured for serial flow. In yet further embodiments, the fluid communication ports are configured such that change parts can be inserted to change the communication port of a filter device from a parallel configuration to a serial configuration and vice versa. This can be accomplished, for example, by inserting or removing a plug in the fluid communication port. In some embodiments, a combination of serial and parallel flow is used for the various filter devices (i.e., a quantity of the filter devices are used for parallel flow, and the remaining quantity of the filter devices are subject to serial flow). In such configurations, the filter devices typically have different types of filter media and filtration requirements. For example, a series of filter devices with depth media may be subjected to parallel flow followed by a filter device with a membrane filter media connected in series.

In some embodiments, the filter devices are configured to support tangential flow filtration. In such configurations, two fluid communication ports are in fluid communication with at least one of the chambers and are separated from each other such that the source fluid needs to travel along a length of the filter media (i.e., tangential flow).

In addition to the use as filtering device, one of ordinary skill in the art of cell growth technology will recognize the capability of using the apparatuses and methods of the present disclosure for cell growth. For such purposes, the filter media of the filter device described can be replaced with a suitable cell growth media. The filter device can thus become a cell growth device.

The cell growth device provides an apparatus for maintaining a controlled environment for the growth of cells. In certain preferred embodiments, multiple cell growth devices are interconnected by multiple fluid inlet and outlet ports to provide the necessary liquid and gas exchange required for optimum cell growth. The individual cell growth devices can be further sealed by a chamber formed by multiple rigid stackable members that may direct a positive or negative fluid pressure, for example, via pressure port similar to pressure port 88, to the outer film walls of the film enclosures of the cell growth device. The compressive and expansion effect on the films walls can create either a directional fluid flow through the cell growth substrate or a rise and fall of the liquid/gas interface across the surface of the cell growth substrate within the cell growth device. The action of compressing or expanding the outer cell growth device walls allows for the controlled rise or fall of the fluid within the cell growth device. The use of valves, including, for example check valves, at up and/or down stream fluid locations allows directional fluid flow to be achieved.

In some embodiments, a combination of cell growth devices and filter devices are configured in stackable members such that both cell growth and filtration can be accomplished within a single apparatus. In some embodiments, cell growth fluid is periodically moved from at least one of the filter devices to at least one of the cell growth devices. Valves are used to control the direction and flow of fluids in accordance with the desired protocol. In some embodiments, waste product may be removed and/or nutrients may be added during the process. In some embodiments, a third expandable device for fluid storage is used that is neither a cell growth device nor a filter device. This third type of device can be used as a temporary storage unit for fluid when rotating fluids between devices in the apparatus (i.e., exchanging fluid in a cell growth device with fluid in a filter device) or adjusting cell growth fluid levels within the cell growth devices.

Various modifications and alterations of the embodiments will be apparent to those skilled in the art without departing from the spirit and scope of the disclosure. It should be understood that the disclosure is not limited to illustrative embodiments set forth herein.

What is claimed is:

1. A filter device comprising:
a first non-permeable film comprising a first fluid communication port to create an inlet fluid connection therethrough to an inlet chamber;
a second non-permeable film comprising a second fluid communication port to create an outlet fluid connection therethrough to an outlet chamber;
a filter element planarly encapsulated by the first and second non-permeable films, the filter element comprising a filter media comprising a first surface facing the outlet chamber, a second surface facing the inlet chamber, a first end, a second end, and a plurality of planarly disposed pleats; and
a framing substrate attached to the filter element, the first non-permeable film, and the second non-permeable film;
wherein at least one of the first non-permeable film or second non-permeable film comprises multiple fluid communication ports; and
wherein the first surface of the first end is attached to the framing substrate which is attached to the first non-permeable film, thereby putting the second surface of the first end in contact with the first non-permeable film, and
wherein the first surface of the second end is attached to the framing substrate which is attached to the second non-permeable film thereby putting the second surface of the second end of the filter media in a compressible state against the framing substrate upon flow of fluid into the inlet chamber.

2. The filter device of claim 1 wherein the filter media comprises a width defined by two substantially parallel edges, the first end and second end being substantially perpendicular to the two parallel edges; wherein the first and second non-permeable films, the framing substrate, and the filter element are further attached together along the two parallel edges.

3. The filter device of claim 1, wherein the framing substrate comprises a single, continuous member.

4. The filter device of claim 2, wherein the two parallel edges and the first and second ends of the filter media define a rectangular periphery, wherein the interior of the rectangular periphery defines an operative filtration area.

5. The filter device of claim 4, wherein the framing substrate is attached along the rectangular periphery and having one or more apertures permitting fluid communication with the operative filtration area.

6. The filter device of claim 1, wherein the first and second non-permeable films each have a first end and a second end, and wherein the first ends and the second ends of the first and second non-permeable films are attached together.

7. The filter device of claim 1 further comprising a flat drainage substrate in contact with at least a portion of one of the first surface or the second surface.

8. The filter device of claim 1, wherein the first surface of the first end of the filter media is attached to a first face of the framing substrate and the first face of the framing substrate is also attached to the first non-permeable film.

9. The filter device of claim 1, wherein the second non-permeable film further comprises a third fluid communication port that is in fluid communication with the inlet chamber.

10. A filter system comprising a plurality of filter devices according to claim 1 that are in fluid communication.

11. The filter system of claim 10, wherein the filter devices are configured for parallel flow.

12. The filter system of claim 10, wherein the filter devices are configured for series flow.

* * * * *